United States Patent
Frommann et al.

(10) Patent No.: US 9,139,085 B2
(45) Date of Patent: Sep. 22, 2015

(54) MOTOR VEHICLE FLAP ARRANGEMENT

(71) Applicant: GM GLOBAL TECHNOLOGY OPERATIONS LLC, Detroit, MI (US)

(72) Inventors: Markus Frommann, Bingen am Rhein (DE); Heiko Betzen, Bausendorf (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 11 days.

(21) Appl. No.: 14/028,763

(22) Filed: Sep. 17, 2013

(65) Prior Publication Data

US 2014/0084620 A1    Mar. 27, 2014

(30) Foreign Application Priority Data

Sep. 17, 2012  (DE) .................. 10 2012 018 489

(51) Int. Cl.
 *B60K 15/04*  (2006.01)
 *B60K 15/05*  (2006.01)

(52) U.S. Cl.
 CPC ......... *B60K 15/05* (2013.01); *B60K 2015/0538* (2013.01)

(58) Field of Classification Search
 CPC ............... B60K 2015/053; B60K 2015/0576; B60K 2015/0425; B60K 15/04; B60K 15/0406
 USPC ............ 296/97.2, 97.22, 155, 207; 220/86.2
 See application file for complete search history.

(56) References Cited

U.S. PATENT DOCUMENTS

| 6,499,789 | B2  | 12/2002 | Moll et al. |
| 7,185,938 | B2* | 3/2007  | Beck ........................ 296/97.22 |
| 7,258,245 | B2* | 8/2007  | Bauer ........................... 220/211 |

FOREIGN PATENT DOCUMENTS

| DE | 10109649 A1    | 9/2002  |
| DE | 10330503 A1    | 2/2005  |
| DE | 202011050412 U1 | 8/2011  |
| DE | 202010008751 U1 | 1/2012  |
| DE | 102011012699 A1 | 9/2012  |
| GB | 2348922 A      | 10/2000 |
| WO | 2005007769 A1  | 8/2005  |

OTHER PUBLICATIONS

German Patent Office, German Patent Search Report for Application No. 102012018489.1, dated Aug. 9, 2013.

* cited by examiner

*Primary Examiner* — Joseph D Pape
*Assistant Examiner* — Dana Ivey
(74) *Attorney, Agent, or Firm* — Ingrassia Fisher & Lorenz PC

(57) ABSTRACT

A flap arrangement is provided for a motor vehicle, with a movably mounted flap that is in particular preloaded, in particular a tank flap, a holder for fixing the flap, an actuator for actuating the holder, and an actuator for actuating the actuator. The actuator is equipped in order to actuate the holder for fixing and for releasing the flap.

15 Claims, 4 Drawing Sheets

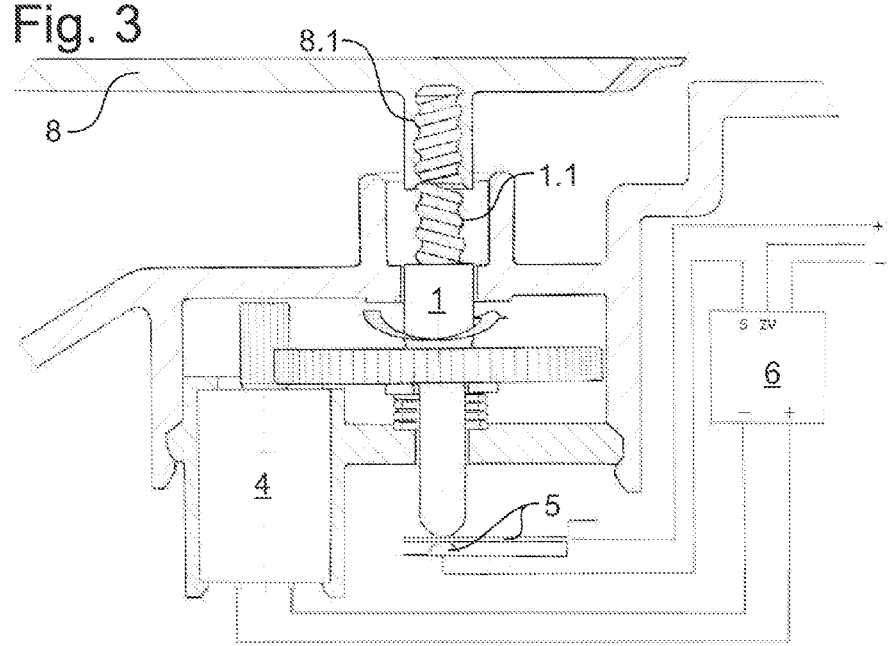
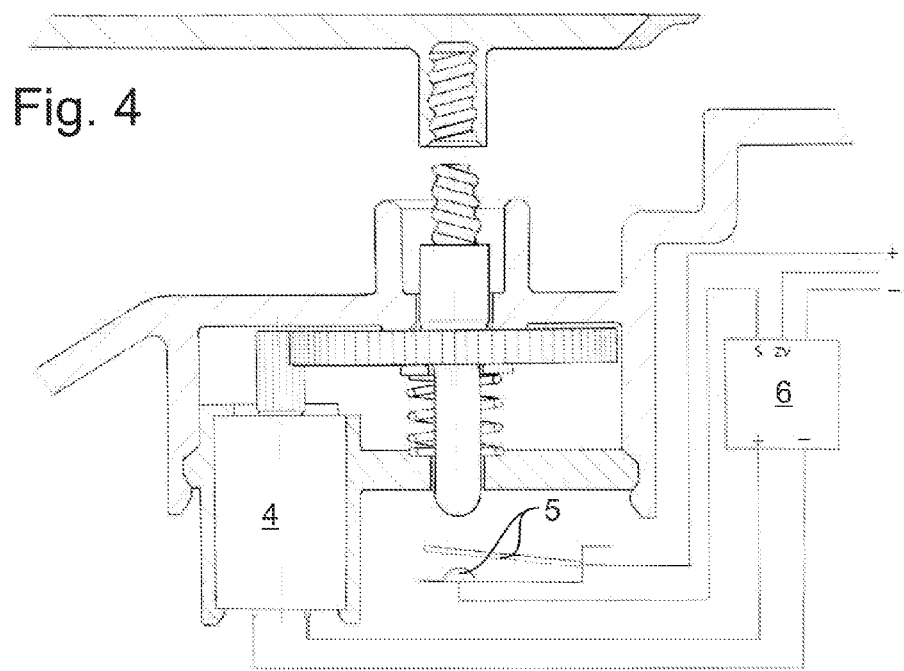

US 9,139,085 B2

MOTOR VEHICLE FLAP ARRANGEMENT

CROSS-REFERENCE TO RELATED APPLICATION

This application claims priority to German Patent Application No. 10 012 018 489.1, filed Sep. 17, 2012, which is incorporated herein by reference in its entirety.

TECHNICAL FIELD

The technical field relates to a flap arrangement for a motor vehicle having a movably mounted flap, in particular a tank flap, a motor vehicle, in particular a passenger car, having such a flap arrangement, and to a method and a computer program product for controlling an actuator of such a flap arrangement.

BACKGROUND

From WO 2005/077699 A1 a device for locking and unlocking a tank flap on motor vehicles with a locking part is known, which can be moved into an unlocking position through an electromagnet. The locking part comprises a bevel, via which upon a closing movement of the flap it is shifted against a compression spring in the direction of the unlocking position. Following the overcoming of a geometry-related locking point, the locking part engages through the compression spring and holds the flap closed.

In view of the foregoing, at least one object is to improve a flap arrangement. In addition, other objects, desirable features, and characteristics will become apparent from the subsequent summary and detailed description, and the appended claims, taken in conjunction with the accompanying drawings and this background

SUMMARY

A flap arrangement for a motor vehicle according to an embodiment comprises a flap, which is movably mounted in particular pivotably, on a vehicle structure, in particular a body of the motor vehicle. In an embodiment, the flap can be rotatably mounted about an axis on the vehicle structure, which is preferentially, at least substantially, oriented vertically. In an embodiment, the flap is preloaded in a movement direction, in particular opening or closing direction, in a further embodiment, through a spring, in particular through a torsion and/or tension spring. The flap can in particular be a tank flap, accordingly, the embodiments are explained in the following in particular on the example of a tank flap, but are not restricted to this example. It can equally be another covering flap on the vehicle exterior or a flap arranged in the vehicle interior in particular a passenger compartment or load compartment of the vehicle. A tank flap is particular a flap that is provided or arranged for covering a one or multi-channel tank opening of the vehicle for filling in liquid and/or gaseous material, in particular fuel, and/or for connecting an electrical charging plug for charging an electric energy storage unit of the vehicle. In a further development, the closed flap, preferentially alongside its entire circumference, terminates flush with a surface of the vehicle surrounding it, in particular a vehicle body.

According to an embodiment, the flap arrangement comprises holder for the in particular positively joined and/or frictionally joined fixing of the flap, an actuator for actuating, in particular moving and/or fixing this holder, and an actuator. The actuator is equipped in order to actuate the holder for fixing and for releasing the flap. In that the holder can also be actuated by the actuator for fixing the flap, the fixing can be improved. In particular, its reliability can be increased. Additionally or alternatively, the flap can be fixed in a predetermined position that is preferentially adjustable through the actuator. Accordingly, the holder is equipped or designed in a further development in order to fix the flap in at least two different positions, in particular variably or continuously between two different positions.

In an embodiment, the flap is adjustable guided by the holder. This means that in particular the flap, in particular guided in a positively joined manner through the holder, is adjustable from one into a further position. Preferentially, the flap because of this can be brought through the holder into a position that is flush with flap surroundings, in particular a vehicle body, fixed in a position which with respect to this is opened out and/or recessed with respect to this or can be brought into such a position.

In an embodiment, the holder comprises a thread, which can be brought into engagement with a counter-thread of the flap in order to fix the flap. The holder releases the flap when thread and counter-flap are brought out of engagement. Here, the thread of the holder can in particular be an external thread or internal thread, the counter-thread can in particular be an internal thread or an external thread. In a further development, the thread can be designed with the holder and/or the counter-thread can be designed integrally with the flap. In particular through a thread and a counter-thread that is in engagement with the former, the flap can be fixed in various positions and adjusted in a positively joined guided manner.

In an embodiment, the holder is movably mounted. It can in particular be designed as a movably mounted spindle, which in a further development can comprise the above explained thread on a face end. In a further development, the holder is movably mounted in movement direction of the flap. A movement direction of the flap in this case is to mean in particular a direction in which the flap can be transferred between an opened or released position and a closed or fixed position. If the flap is pivotably mounted about a pivot axis, a movement direction can in particular be a tangential direction to this pivot direction. In an embodiment the holder is at least substantially linearly or translatorically displaceably mounted. In particular, for compensating a deviation between the tangential direction which varies with a pivot angle and was explained above and a movement direction of a linear mounting, the thread and counter-thread explained above can have angular play. Here, this is to mean in particular that an axis of the counter-thread can deviate relative to an axis of the thread with that it is in engagement by an angle. Additionally or alternatively, a linear mounting or guiding of the holding means can comprise a twisting play of the holding means, so that the axis of the latter can orient itself to the movement direction of the flap.

In a further development, the holder is movably mounted against a preload. To this end, the flap arrangement can comprise a spring, in particular a tension or compression spring, which can be designed or arranged so that with the closed flap it can be preloaded, in particular stretched or compressed in longitudinal direction. In this way, the holder, in particular with opened flap, can be preloaded into a well-defined position, in particular in order to raise or open an electrical contact.

In an embodiment, the actuator can be actuated through a manual movement of the flap. The actuator can in particular comprise an electrical switch, in particular a non-activated open switch or button, preferentially a push button switch. The switch can be preloaded into an open position in particular through a spring.

In a further, the actuator can be directly actuated through the flap or indirectly, in particular via the holder. In a further development, the holder can be a preferentially rounded contact surface in particular on a face end facing away from the flap or located opposite the flap, through which the switch can be actuated. In a further development, the holder itself can comprise an electrically conductive contact region for closing an electrical contact of the actuator or form a part of the actuator.

In an embodiment, the actuator and the holder are coupled via a gearing, in particular a gear wheel gearing. In particular, when the holder comprises a thread that can be brought into engagement with a counter-thread of the flap in order to adjust or fix or release said flap, the holder can be rotatably mounted in an embodiment. The actuator can then be designed or arranged for rotary-actuating or for loading the holder with a torque. To this end, an output shaft of the actuator, in particular an electric motor of the actuator, can be coupled to the holder via one or a plurality of gear wheel stages, in particular at least one spur wheel and/or rack or worm stage and/or planet stage. A gear wheel stage, in particular a spur wheel stage can comprise a gear wheel and a further gear wheel meshing with the former. In order to movably mount the holder, the further gear wheel can be movably in engagement with the one gear wheel. Equally, the further gear wheel can be fastened on the actuator or the holder in a rotationally fixed yet axially movable manner.

In order to fix and release the flap, the holder is actuated in opposite directions in an embodiment. To this end, the flap arrangement in a further development comprises a reverser for the opposite-direction actuating of the holder. The reverser can in particular be a switcher of a gearing, which couple the actuator and holder, and transmits a rotary movement of the actuator depending on switch position to the holder in opposite direction. Equally, the reverser, in particular with regard to a program, can be integrated in a controller of the actuator and equipped in order to activate the actuator in the opposite direction. In a further development, the reverser is equipped in order to reverse the direction of rotation of an electric motor of the actuator, in particular in order to energize the electric motor in the opposite direction.

In an embodiment, the flap arrangement comprises a controller that is equipped in order to control the actuator based on actuation, actuation duration and/or actuation sequence of the actuator and/or a state, in particular of a position, of the flap and/or of the vehicle, in particular of a central locking and/or power supply, and/or a force. Accordingly, it is provided according to an embodiment, to control the actuator based on an actuation, actuation duration, and/or actuation sequence of the actuator and/or of a state, in particular of a position, of the flap, and/or of a force.

In an embodiment, the actuator can be controlled based on an actuation of the actuator. In particular, it can actuate the holder for as long as the actuator is actuated, for example a pressure switch is closed. Additionally or alternatively it can be provided that the actuator actuates the holder based on an actuating duration of the actuator. In particular, it can actuate the holder in a predeterminable manner, for example by a predetermined adjusting travel or up to the reaching of a predetermined force, if the actuator is or has been actuated for a predetermined period of time, for example a pressure switch is closed for a predetermined period of time. In an embodiment, this period of time can be very short, in particular impulse-like. Accordingly, the actuator, in an embodiment, can actuate the holder in a predetermined manner, for example by a predetermined adjusting travel or up to the reaching of a predetermined force, when the actuator is or has been actuated impulse-like. Additionally or alternatively it can be provided that the actuator actuates the holder based on an actuating sequence of the actuator. In particular, it can actuate the holder in a predetermined manner for example in a predetermined movement direction if it has been actuated beforehand. In a further development, the actuator can alternately actuate the holder in opposite direction upon successive actuation of the actuator, in particular alternately energize an electric motor in opposite directions and/or alternately reverse its direction of rotation. Equally, a sense of direction of the actuator can be predetermined for example by one-off actuating of the actuator for a predetermined period of time, a multiple actuating within a predetermined period of time, for example twice briefly in succession, or by actuating for another predetermined period of time, an opposite sense of direction.

Additionally or alternatively, the actuator can be controlled based on a state, in particular a position of the flap. In particular, it can actuate the holder for fixing the flap if it is in an opened state, when the actuator is actuated, and/or actuate the holder for releasing the flap when it is in a closed state, when the actuator is actuated. Additionally or alternatively it can be provided that the actuator actuates the holder based on a force. For the more compact representation in a general way, a force in terms is to also mean an anti-parallel force couple, i.e., a torque. In particular, the actuator can actuate the holder in a predetermined manner, when a predetermined force acts on the actuator, the flap, the holder and/or the actuator, in particular a force acting thereon exceeds or undershoots a predetermined value. Thus it can be provided that the actuator actuates the holder until this actuation, in particular due to a stop, is subjected to a counterforce that exceeds a predetermined limit value.

In general, in an embodiment, the controller can control the actuator based on a travel or be designed for such, in particular command a predetermined adjusting travel the in a further development at least substantially can correspond to a screw-in depth of a thread and counter-thread of holder and flap. Controlling based on a travel is to mean in particular also a number of revolutions control. Additionally or alternatively, the controller can control the actuator based on a force or be designed for such, in particular to command a predetermined adjusting force and/or on reaching a predetermined adjusting force, adjust an actuation. A controlling is to mean for the more compact representation also a regulating, i.e., the controlling based on a sensed actual quantity, preferentially sensed through a sensor, for example of an actual position of the tank flap or actual force of the actuator.

Additionally or alternatively, the actuator can be controlled based on a state of the vehicle, in particular of a central locking and/or power supply in particular ignition. In particular, an actuation can be prevented in opening direction or for releasing when a central locking is closed and/or a power supply, in particular ignition, is interrupted, or an actuation in opening direction or for releasing be only permitted when a central locking is opened and/or a power supply, in particular ignition, is switched on. Additionally or alternatively an actuation in closing direction or for closing can also be permitted when a central locking is closed and/or a power supply, in particular ignition, is interrupted. Thus the driver can also close the flap with the actuator even after the closing of the central locking or interruption of a power supply.

A hardware and/or software design, in particular a digital processing unit that is preferentially data or signal connected to a storage and/or bus system, in particular a microprocessor unit (CPU) and comprise one or a plurality of programs or program modules. The CPU can be designed in order to execute commands that are implemented as a program stored in a storage system, to receive input signals from a data bus and/or to emit output signals to a data bus. A storage system can comprise one or a plurality of in particular different storage media, in particular optical, magnetic, and solid-state and/or other non-volatile media. The program can be of such a nature that it is capable of embodying or carrying out the method described here, so that the CPU can execute the steps of such methods and thereby control in particular the actuator.

Additionally or alternatively to a force control, in particular a stopping of the actuator on reaching a resistance in particular due to a stop against a further retraction or closing of the flap, a slip clutch can be arranged between actuator and flap, in particular between actuator and holder, which opens when a predetermined force is exceeded.

BRIEF DESCRIPTION OF THE DRAWINGS

The present invention will hereinafter be described in conjunction with the following drawing figures, wherein like numerals denote like elements, and:

FIG. 3 is the flap arrangement of FIG. 2, with, compared with FIG. 2, the manually pressed-down flap adjusted in opening direction;

FIG. 4 is the flap arrangement of FIG. 3, with, compared with FIG. 3, released flap;

DETAILED DESCRIPTION

The following detailed description is merely exemplary in nature and is not intended application and uses. Furthermore, there is no intention to be bound by any theory presented in the preceding background or summary or the following detailed description.

Figure 1:
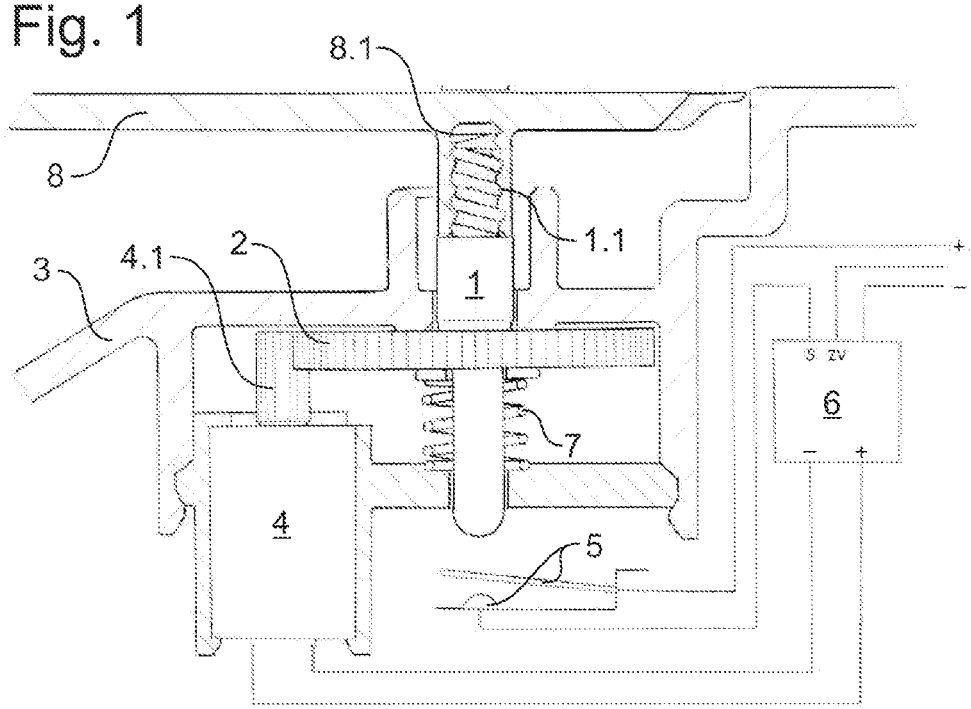
FIG. 1 is a flap arrangement according to an embodiment in section with closed or fixed flap.

FIG. 1 shows a flap arrangement according to an embodiment. This flap arrangement comprises a tank flap 8, which in a manner that is not shown in FIG. 1 is movably mounted on a body 3 of a passenger car. The body 3 comprises a cup, in which a tank opening (not shown) is arranged, which can be covered by the tank flap 8. The tank flap 8 can be pivoted by means of a hinge arrangement (not shown) about a pivot axis that is perpendicular to the drawing plane of FIG. 1, wherein a torsion spring (not shown) preloads the tank flap 8 in an embodiment in FIG. 1 in clockwise direction into a closed position in a modification in anti-clockwise direction into an opened position. In the position shown in FIG. 1, the tank flap 8 terminates flush alongside its circumference with the edge of the body 3 surrounding it.

The flap arrangement comprises a spindle-like holder 1 for fixing the tank flap 8, an actuator with an electric motor 4 for actuating the holder 1, an actuator in the form of a pressure switch 5 for actuating the electric motor 4 and a controller in the form of a CPU 6, which is signal or energy-connected to the electric motor 4 and the pressure switch 5. The CPU 6 can be signal-connected to a control unit of the vehicle (ECU) or at least partially integrated in or implemented by the latter.

The CPU 6 comprises a reverser preferentially of program design for the opposite-direction actuating of the holder, in that it is equipped to optionally load the electric motor 4 in the opposite direction, i.e., optionally in the mathematically positive or negative sense or optionally in clockwise or anti-clockwise direction, as is described in more detail in the following.

The holder 1 comprises a thread 1.1 on its face end (top in FIG. 1) facing the tank flap 8, which can be brought into engagement with a counter-thread 8.1 of the tank flap 8 in order to fix said tank flap. On its face end located opposite, the holder 1 comprises a rounded contact surface, through which the pressure switch 5 can be actuated.

To this end, the holder 1 is movably mounted in movement direction of the tank flap 8 (vertically in FIG. 1) in two aligned recesses of body 3 and electric motor holder respectively and preloaded through a compression spring 7 against a movement in closing direction of the tank flap 8. As is described in the following, the pressure switch 5 can thus be actuated via the holder 1 through a manual movement of the tank flap 8 in closing direction (downwards in FIG. 1).

The electric motor 4 and the holder 1 are coupled via a gear wheel gearing with a gear wheel 4.1 and a further gear wheel 2 meshing therewith, which is designed rotationally and axially fixed with the spindle-like holder 1, and can thus be shifted with the latter. Through the electric motor 4, the holder 1 can be optionally actuated in clockwise or anti-clockwise direction. Because of the thread 1.1 and the counter-thread 8.1, the holder 1 adjusts with thread 1.1 and counter-thread 8.1 in engagement, the tank flap 8 in opening or closing direction in a positively-joined guided manner. When thread 1.1 and counter-thread 8.1 are or enter into engagement, these fix the tank flap 8 in a positively joined or frictionally joined manner. If they are or rendered out of engagement, the tank flap 8 is or will be released through this.

In the following, with reference to the figure sequence FIG. 1→FIG. 2→FIG. 3→FIG. 4→FIG. 5→FIG. 6→FIG. 1 or FIG. 7, a method for controlling the electric motor 4 and thus for opening or releasing (Figure sequence FIG. 1→FIG. 2→FIG. 3→FIG. 4) and for closing or fixing (Figure sequence FIG. 4→FIG. 5→FIG. 6→FIG. 1) the tank flap 8 is explained, as can be carried out in particular by the CPU 6. FIG. 7 constitutes the method in the form of a state diagram or state machine.

In FIG. 7, "A" describes a state which in particular corresponds to the depiction of FIG. 1, i.e., with completely closed tank flap 8. By manually pressing down the tank flap 8 (Figure sequence FIG. 1→FIG. 2), the pressure switch 5 is actuated, which transmits a signal "S" to the CPU 6 for as long as it is closed. A central locking transmits a signal "ZV" to the CPU 6 which indicates if it is closed ("ZV=1") or not ("ZV=0").

Figure 2:
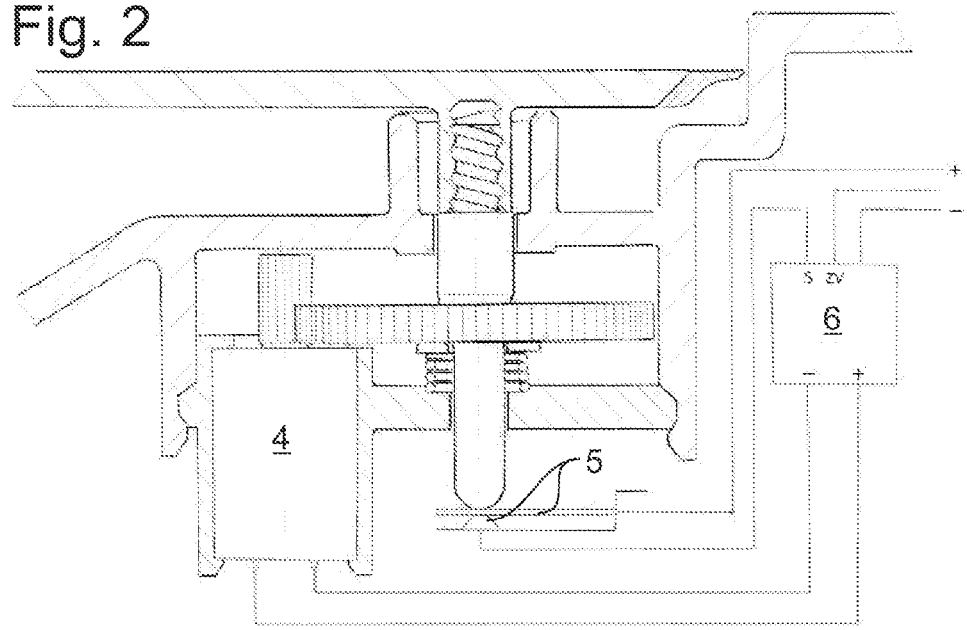
FIG. 2 is the flap arrangement of FIG. 1 with, compared to FIG. 1, flap manually pressed-down.

When the signals "S" and "ZV"=0 are present in a cumulative manner, i.e., when the operator actuates the pressure switch 5 via the tank flap 8 and the holder 1, and the central locking is not closed, the CPU 6 goes into a state B, which corresponds to the depiction of FIG. 3 (Fig. sequence FIG. 2→FIG. 3). In this state B, the CPU 6 controls the electric motor 4 so that it actuates the holder 1 for releasing the tank flap 8. To this end, the reversing means that is implemented program-wise in the CPU 6 predetermines the direction of rotation indicated by an arrow in FIG. 3, which causes the tank flap 8 to be opened out in opening direction (towards the top in FIG. 3).

In this state, the CPU remains for as long as the signal "S" is present, i.e., the operator presses on the tank flap 8. If this signal "S" is eliminated (FIG. 7: "−S"), the CPU 6 goes into a state "C", which in particular corresponds to the depiction of FIG. 4 (Fig. sequence FIG. 3→FIG. 4). In this state, the CPU 6 terminates the energizing of the electric motor 4.

If the operator has pressed onto the tank flap 8 until the electric motor 4 has unscrewed or brought out of engagement the thread 1.1 from the counter-thread 8.1, the tank flap 8 which is now opened out is released and can be completely opened through the operator and/or a torsion spring preloaded in opening direction in order to open the access to the tank opening. If the operator stops pressing the tank flap 8 before reaching the released position of the tank flap 8, the tank flap 8 which continues to be fixed in this exemplary embodiment remains in an opened-out position (see FIG. 3).

In a modification, the CPU 6 can remain in the state B until a sensor senses that thread 1.1 and counter-thread 8.1 are out of engagement and/or until the holder 1 has opened out the tank flap 8 by a corresponding adjusting travel or the electric motor 4 has reached a corresponding number of revolutions. This can take place independently of the continuing actuation of the pressure switch 5. It can thus in particular be sufficient to actuate the pressure switch for a predetermined, even short, in particular impulse-like period of time by pressing down the tank flap 8 and subsequently reopen the pressure switch 5 again by releasing the preloaded tank flap 8. In FIG. 7, this can be imagined illustrated in that "S" means the presence of at least one of the following conditions: (1). The pressure switch 5 is (no longer) actuated or closed; (2) thread 1.1 and counter-thread 8.1 are out of engagement; (3) the tank flap 8 has been opened out by a predetermined adjusting travel or the electric motor has reached a predetermined number of revolutions, which correspond to a complete releasing of the tank flap 8, for example a maximum thread length of the thread 1.1 and counter-thread 8.1.

Figure 5:
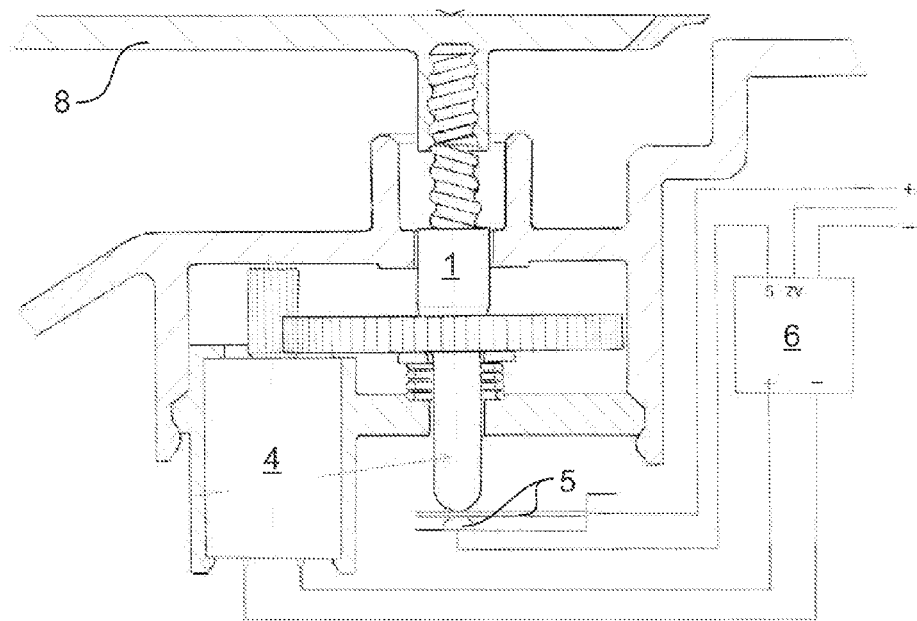
FIG. 5 is the flap arrangement of FIG. 4, with, compared with FIG. 4, manually pressed-down flap.
Figure 6:
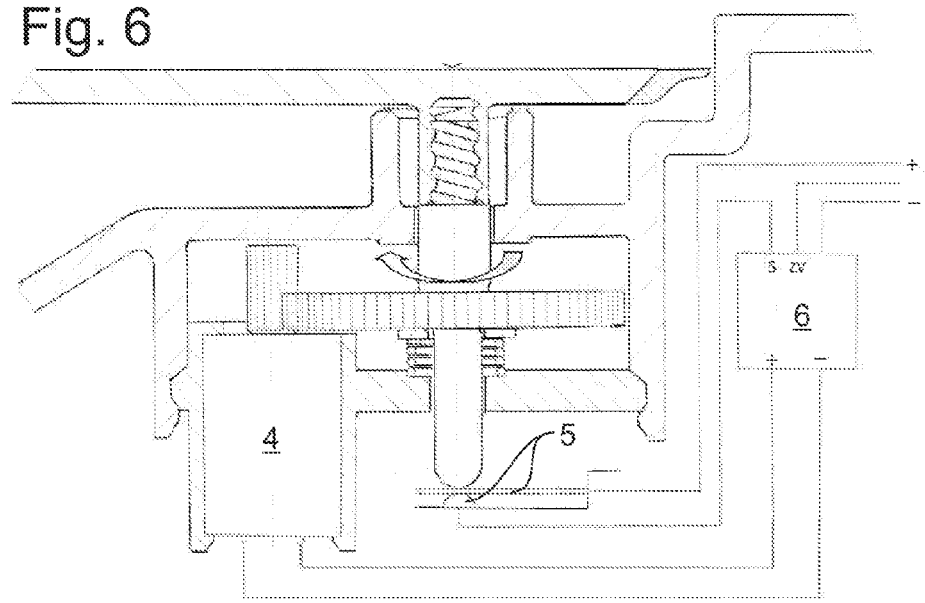
FIG. 6 is the flap arrangement of FIG. 5 with, compared with FIG. 5, the manually pressed-down flap adjusted in closing direction.
Figure 7:
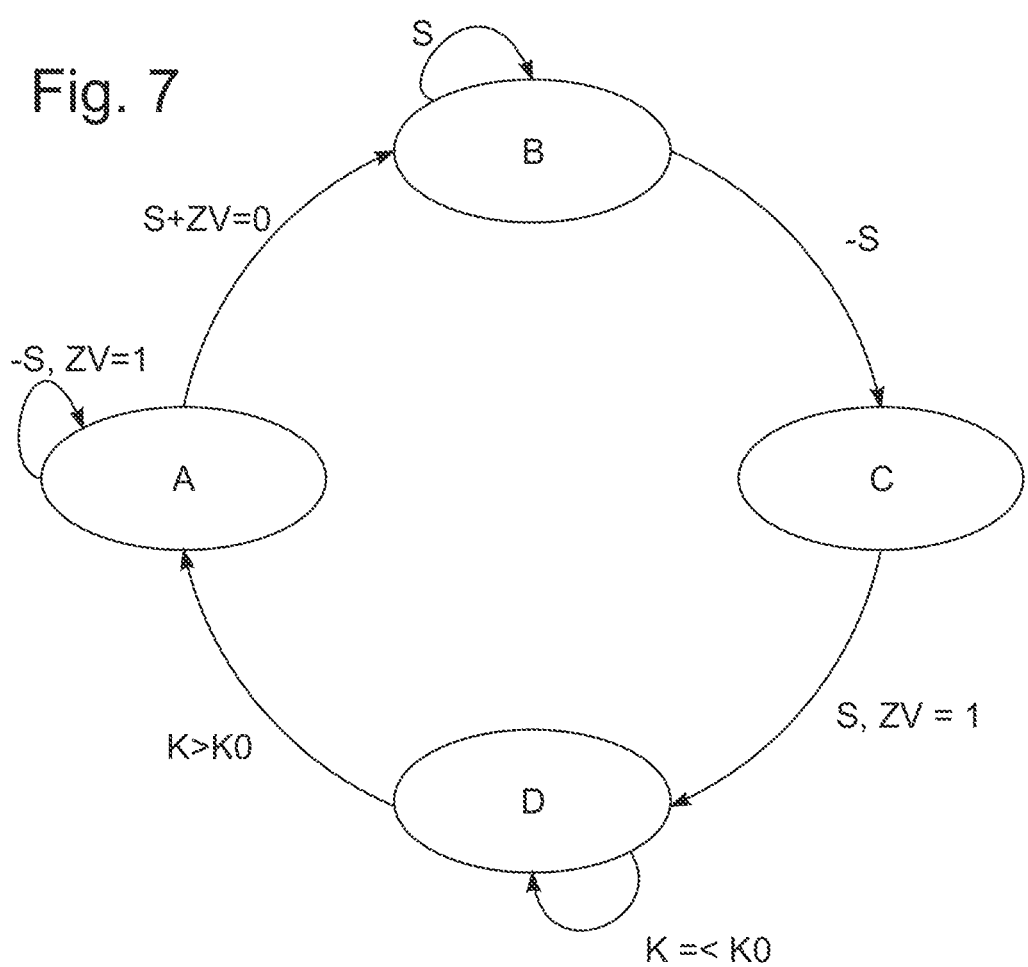
FIG. 7 is a method for controlling the actuator of the flap arrangement of FIG. 1-6 according to an embodiment.

If in the state C the pressure switch 5 is again actuated (figure sequence FIG. 4→FIG. 5), the CPU 6 goes into a state D, which in particular corresponds to the depiction of FIG. 6 (figure sequence FIG. 5→FIG. 6). In this state C, the CPU 6 controls the electric motor 4 so that it actuates the holder 1 in the opposite direction to state B or for fixing the tank flap 8. To this end, the reverser is implemented program-wise in the CPU 6 predetermines the opposite direction of rotation indicated by an arrow in FIG. 6, which brings about a retraction of the tank flap 8.

The CPU 6 remains in this state for as long as a force of the electric motor 4 does not exceed a predetermined limit value (FIG. 7: "K=<K0"). This can, for example, be sensed through a power consumption of the travel, in particular number of revolutions-controlled electric motor 4. When the electric motor 4 has completely retracted the tank flap 8, thread 1.1 and counter-thread 8.1 for example move against a stop, the force exerted by the electric motor 4 increases and exceeds the predetermined limit value (FIG. 7: "K>K0").

Following this, the CPU 6 goes into the state A (figure sequence FIG. 6→FIG. 1). In this state, the CPU 6 terminates the energizing of the electric motor 4, the retracted tank flap is fixed through thread 1.1 and counter-thread 8.1 because of the self-locking of the electric motor 4. Equally, the CPU 6 can change from state C to D through a closing of the central locking, in particular when the tank flap 8 is preloaded in the closing position through a torsion spring. In this way, an opened tank flap 8 which abuts the holding means 1 under preload and a tank flap 8 which is not completely released (see above the omission of the manual loading of the tank flap 8 before the complete releasing) can be completely closed and fixed when closing a central locking. In addition or alternatively to a closing of a central locking, a switching-off of an ignition of the vehicle can be analogously taken into account.

In order to avoid continuous empty rotating with thread 1.1 and counter-thread 8.1 out of engagement, the CPU 6 can also go into the state A even when the electric motor has reached a predetermined number of revolutions. In FIG. 7, this can be imagined illustrated in that "K>K0" means the presence of at least one of the following conditions: (1) the force exerted by the electric motor 4 exceeds the predetermined limit value; (2) the electric motor 4 has reached a predetermined number of revolutions.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A flap arrangement for a motor vehicle, comprising:
   a tank flap;
   a holder that is configured to fix the tank flap;
   a first actuator that is configured to actuate the holder, wherein the first actuator is further configured to actuate the holder to fix and release the tank flap; and
   a second actuator that is configured to actuate the first actuator,
   wherein the holder comprises a thread, wherein the tank flap comprises a counter-thread, wherein the thread is configured to engage with the counter-thread in order to fix the tank flap when the thread and the counter-thread are brought into engagement, and
   wherein the holder is configured to release the tank flap when the thread the counter-thread are brought out of engagement.

2. The flap arrangement according to claim 1, wherein the tank flap is guidedly adjustable via the holder.

3. The flap arrangement according to claim 1, wherein the holder is movably mounted in a movement direction of the tank flap.

4. The flap arrangement according to claim 1, wherein the second actuator is actuated via a manual movement of the tank flap.

5. The flap arrangement according to claim 1, further comprising:
   a first gear wheel; and
   a second gear wheel that meshes with the first gear wheel;
   wherein the actuator and the holder are coupled to the first gear wheel and the second gear wheel,
   wherein the second gear wheel is shiftably mounted and moveable with respect to the first gear wheel.

6. The flap arrangement according to claim 1, wherein the first actuator comprises an electric motor.

7. The flap arrangement according to claim 1, wherein the first actuator is further configured to:
   actuate the holder in a first direction to fix the tank flap, and
   actuate the holder in a second direction opposite to the first direction to release the tank flap.

8. The flap arrangement according to claim 1, further comprising a controller that is equipped in order to control the first actuator based on an actuation.

9. A motor vehicle comprising:
a vehicle structure; and
a flap arrangement mounted on the vehicle structure, the flap arrangement comprising:
a holder that is configured to fix a tank flap;
a first actuator that is configured to actuate the holder, wherein the first actuator is further configured to actuate the holder to fix and release the tank flap; and
a second actuator that is configured to actuate the first actuator,
wherein the holder comprises a thread, wherein the tank flap comprises a counter-thread, wherein the thread is configured to engage with the counter-thread in order to fix the tank flap when the thread and the counter-thread are brought into engagement, and
wherein the holder is configured to release the tank flap when the thread and the counter-thread are brought out of engagement.

10. The motor vehicle according to claim 9, wherein the tank flap is guidedly adjustable via the holder.

11. The motor vehicle according to claim 9, wherein the holder is movably mounted in a movement direction of the tank flap.

12. The motor vehicle according to claim 9, wherein the second actuator is actuated via a manual movement of the tank flap.

13. The motor vehicle according to claim 9, firth comprising:
a first gear wheel; and
a second gear wheel that meshes with the first gear wheel;
wherein the actuator and the holder are coupled to the first gear wheel and the second gear wheel,
wherein the second gear wheel is shiftably mounted and moveable with respect to the first gear wheel.

14. The motor vehicle according to claim 9, wherein the first actuator comprises an electric motor.

15. The motor vehicle according to claim 9, wherein the first actuator is further configured to:
actuate the holder in a first direction to fix the tank flap, and
actuate the holder in a second direction opposite to the first direction to release the tank flap.

* * * * *